(12) United States Patent  
Kindred

(10) Patent No.: US 7,055,881 B2
(45) Date of Patent: Jun. 6, 2006

(54) UTILITY BOX FOR AN AGRICULTURAL VEHICLE

(75) Inventor: Thomas Charles Kindred, Essex (GB)

(73) Assignee: CNH America LLC, New Holland, PA (US)

( * ) Notice: Subject to any disclaimer, the term of this patent is extended or adjusted under 35 U.S.C. 154(b) by 49 days.

(21) Appl. No.: 10/992,932

(22) Filed: Nov. 19, 2004

(65) Prior Publication Data

US 2005/0156444 A1    Jul. 21, 2005

(30) Foreign Application Priority Data

Nov. 22, 2003   (GB) ................................ 0327231.7

(51) Int. Cl.
 *B60N 3/12*   (2006.01)
(52) U.S. Cl. ................... 296/37.6; 180/89.12
(58) Field of Classification Search ............... 296/37.6, 296/37.1; 224/404, 410, 282; 180/89.12
See application file for complete search history.

(56) References Cited

U.S. PATENT DOCUMENTS

| 4,013,136 | A | * | 3/1977 | Fear ........................... 296/37.1 |
| 4,216,869 | A | * | 8/1980 | Grove ......................... 212/290 |
| 4,244,443 | A | * | 1/1981 | Naka ........................... 182/84 |
| 4,249,295 | A | * | 2/1981 | Lance .......................... 296/10 |
| 4,733,898 | A | * | 3/1988 | Williams .................... 296/37.6 |
| 4,830,242 | A | * | 5/1989 | Painter ....................... 296/37.6 |
| 4,917,430 | A | * | 4/1990 | Lawrence ................... 296/37.6 |
| 5,125,710 | A | * | 6/1992 | Gianelo ....................... 296/37.6 |
| 5,316,358 | A | * | 5/1994 | Payne et al. ................ 296/37.6 |
| 5,673,767 | A | * | 10/1997 | Uno et al. ................ 180/89.12 |
| 5,772,271 | A | * | 6/1998 | Sanders ...................... 296/37.6 |
| 5,816,630 | A | * | 10/1998 | Bennett et al. ........ 292/341.17 |
| 5,895,086 | A | * | 4/1999 | Carico ......................... 296/37.6 |
| 6,328,365 | B1 | * | 12/2001 | Adsit .......................... 296/37.6 |
| 6,340,191 | B1 | * | 1/2002 | Brady ......................... 296/37.6 |
| 6,817,433 | B1 | * | 11/2004 | Bergstrom et al. ....... 180/89.12 |
| 6,866,332 | B1 | * | 3/2005 | Takeuchi et al. .......... 180/89.12 |
| 6,899,379 | B1 | * | 5/2005 | Milenovich ................ 296/37.6 |
| 2004/0079777 | A1 | * | 4/2004 | Schomaker et al. ........ 224/404 |

FOREIGN PATENT DOCUMENTS

DE              19541664 A1    5/1997

* cited by examiner

Primary Examiner—Kiran B. Patel
(74) Attorney, Agent, or Firm—John William Stader; Stephen A. Bucchianeri; Michael G. Harms

(57) ABSTRACT

An agricultural vehicle includes a cab for an operator of the agricultural vehicle, the cab including a floor, and a utility box mounted beneath the floor for displacement between a storage and an extended position, the utility box including a latch for retaining the utility box in the storage position, the latch being releasable from within the cab.

6 Claims, 1 Drawing Sheet

UTILITY BOX FOR AN AGRICULTURAL VEHICLE

Figure 1:
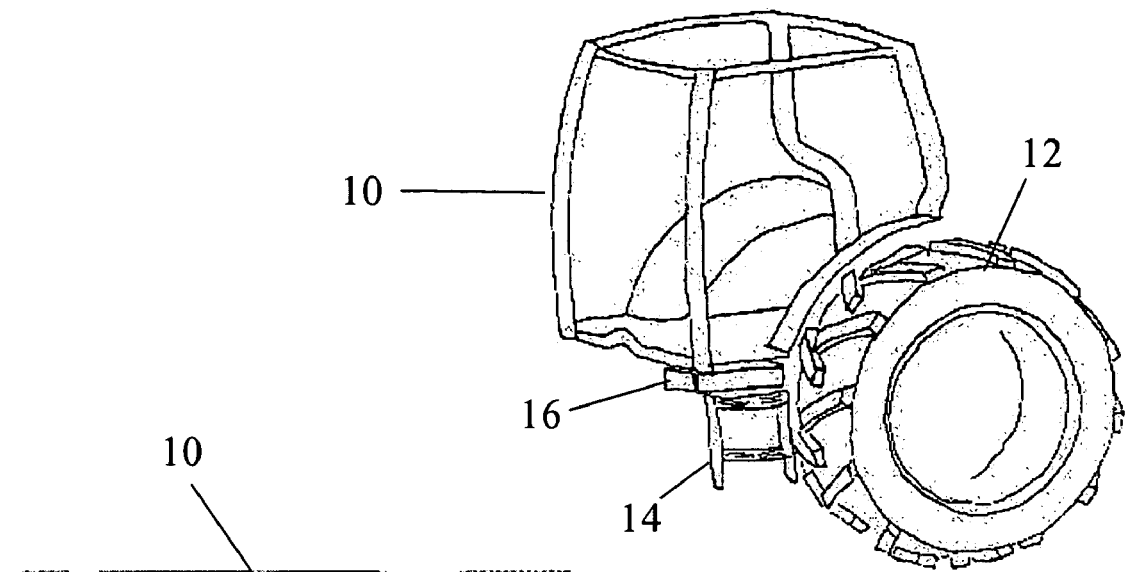

The present invention relates a utility box for an agricultural vehicle, which term is used herein to include tractors, combines and load handling machines such as telehandlers and fork lift trucks.

Agricultural vehicles often have a requirement for storage space for tools and accessories, such as linkage balls, spare power take-off shaft, grease gun, spanners etc. These items need to be readily to hand but there is limited space on the vehicle for them to be stored. Some of the items are often oily or dirty and storing them in the cab is not desirable. If stored outside the cab, however, they need to be held securely, to avoid their theft, and kept away from dust and dirt.

It has previously been proposed, for example in DE-OS-195 41 664, to provide a utility box that is located outside the cab of an agricultural vehicle. For security, these utility boxes have been constructed essentially as a lockable safe that is stored beneath the cab.

According to the preferred embodiment of the present invention, there is provided an agricultural vehicle having a cab for the vehicle operator, comprising a utility box mounted beneath the floor of the cab for displacement between a storage and an extended position, characterised in that a latch is provided for retaining the utility box in the storage position, which latch is releasable from within the cab.

In the case of an agricultural vehicle have an elevated cab accessed by means of steps, the utility box is preferably positioned in vertical alignment with the steps between the top step and the floor of the cab.

The utility box may be slidably mounted in runners beneath the floor of the cab but it is preferred for the utility box to be pivotable about a post fitted to the floor of the cab. Such a construction ensures free movement of the utility box by avoiding the problem of dirt impairing the function of the sliding mechanism.

Because the utility box is stored beneath the cab of the vehicle, it is covered from above in its storage position by the floor of the cab. It is therefore possible and preferred for the utility box not to have a separate lid so that its contents are immediately accessible once it has been moved to its extended position.

The latch mechanism may conveniently comprise a spring biased tongue mounted in the floor of the cab, interacting with a keeper plate mounted on the utility box, the tongue being inaccessible from outside the vehicle when the utility box is in the storage position. A handle or a cable release may be mounted within the cab and connected to the tongue in order to allow the latch to be released manually from within the cab and permit the utility box to be pulled out from under the cab floor.

As the latch cannot be released from outside the cab, it need not be provided with a separate lock. However, for additional security, it is possible to provide a key operated dead lock on the utility box.

In order to safeguard against malfunction of the cab mounted release mechanism of the latch, it is possible to provide the utility box with a key operated release mechanism. In this case, it is preferred that the key of the dead lock should also act to release the latch mechanism.

Figure 2:
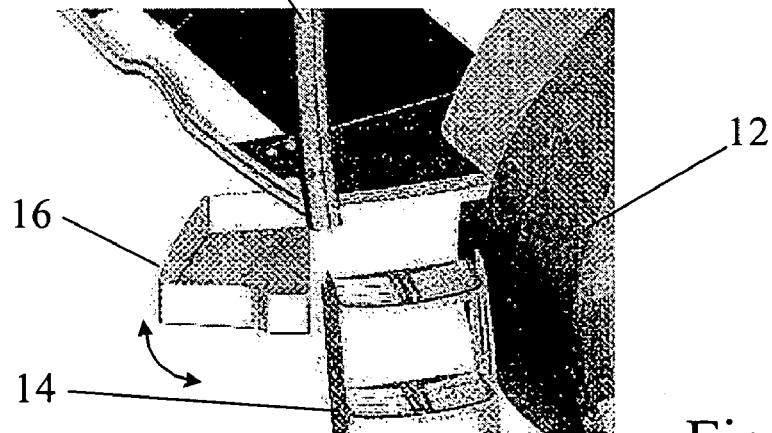
Figure 3:
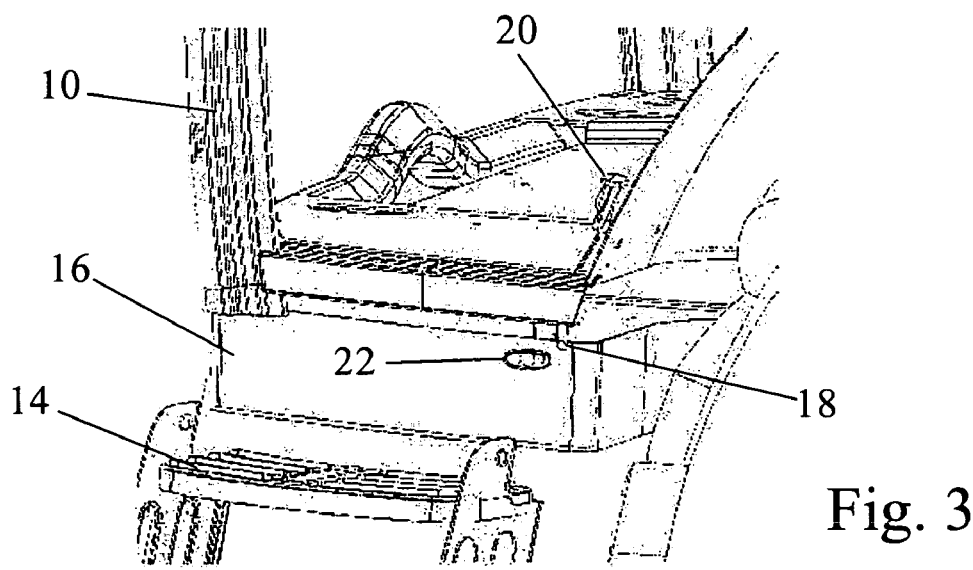

The invention will now be described further, by way of example, with reference to the accompanying drawings, in which:

FIG. 1 is a diagram of part of a tractor showing a utility box mounted beneath the cab floor, FIG. 2 is a representation showing a detail of the tractor of FIG. 1 with the utility box in its extended position, and FIG. 3 is a more detailed wire frame representation of part of the tractor showing the latch release mechanism for the utility box.

FIG. 1 shows a tractor having a cab 10, a rear wheel 12 and steps 14 providing access to the elevated cab 10. A utility box 16 is mounted to the underside of the floor of the cab directly above the tread of the highest of the steps 14 leading to the cab 10.

FIG. 1 shows the utility box 16 in its storage position in which it lies beneath and is covered by the cab floor, the latter preventing the contents of the utility box 16 being accessed. In FIG. 2, the same utility box 16 is shown pivoted out from under the cab 10 to allow tools to be placed in it for storage. To enable such movement of the utility box, it is pivoted relative to the cab about a post (not shown) arranged at its rear left hand corner, as viewed. For security, the pivot post is not accessible from outside the box 16.

As shown in FIG. 3, the box 16 is retained in its closed position by means of a latch mechanism comprising a resiliently biased tongue 18 connected to a cable release 20 arranged within the cab 10. To open the utility box, the release cable 20 is pulled to free the tongue 18 from a keeper plate (not shown) on the rear face of the front side of the box. This allows the box to be pivoted towards its open or extended position shown in FIG. 2. It is possible to design the utility box so that the tongue will again interfere with the rear side of the box 16 to allow it to be opened only partially until the release cable 20 is operated a second time to pull the resilient tongue 18 out of the path of the rear side of the box 16. As an alternative, the rear side of the box may be formed with a notch to allow it to clear the tongue 18 or with a ramped surface for automatically raising the tongue 18 so that the box can pivot to its open position without taking any steps to release the tongue a second time.

In the embodiment shown in FIG. 3, the box 16 is additionally fitted with a key-operated T-shaped handle 22 that can be used to release the tongue 18 without the need to open the cab. This provide an additional safeguard, by allowing the box to be opened in the event of a malfunction of the cable release 20. If desired, the key operated handle 22 may additionally serve to operate a separate deadlock to provide additionally security by preventing access to the contents of the utility box 16 even when the door of the cab is left open.

The invention claimed is:

1. An agricultural vehicle comprising:
   a cab for an operator of the agricultural vehicle, the cab including a floor;
   a utility box mounted beneath the floor for displacement between a storage and an extended position, the utility box including a latch for retaining the utility box in the storage position, the latch being releasable from within the cab; and
   steps for accessing the cab, wherein the utility box is positioned in vertical alignment with the steps between a top step and the floor of the cab; also wherein the utility box is pivotable about a post fitted to the floor of the cab.

2. The agricultural vehicle according to claim 1, wherein the utility box is constructed as a drawer not having a separate lid, the box being closed from above in its storage position by the floor of the cab.

3. The agricultural vehicle according to claim 1, wherein the latch comprises a spring biased tongue mounted in the floor of the cab which interacts with a keeper plate mounted on the utility box, the tongue being inaccessible from outside the vehicle when the utility box is in the storage position.

4. The agricultural vehicle according to claim 3, the latch comprising a handle or cable release mounted within the cab and connected to the tongue in order manually release the tongue from the keeper plate from within the cab and permit the utility box to be pulled out from under the cab floor.

5. The agricultural vehicle according to claim 1, wherein the utility box includes a key-operated lock.

6. The agricultural vehicle according to claim 5, wherein the key-operated lock and the latch are interconnected such that operation of the key-operated lock also acts to release the latch.

* * * * *